United States Patent
Li et al.

(10) Patent No.: US 9,065,697 B2
(45) Date of Patent: Jun. 23, 2015

(54) METHOD AND APPARATUS FOR SHARING DATA CONTENT BETWEEN A TRANSMITTER AND A RECEIVER

(75) Inventors: Mo Li, Shanghai (CN); Yang Peng, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 1238 days.

(21) Appl. No.: 12/097,851

(22) PCT Filed: Dec. 14, 2006

(86) PCT No.: PCT/IB2006/054832
§ 371 (c)(1),
(2), (4) Date: Jun. 17, 2008

(87) PCT Pub. No.: WO2007/072342
PCT Pub. Date: Jun. 28, 2007

(65) Prior Publication Data
US 2008/0270533 A1    Oct. 30, 2008

(30) Foreign Application Priority Data
Dec. 21, 2005    (CN) .......................... 2005 1 0134011

(51) Int. Cl.
| | |
|---|---|
| G06F 15/16 | (2006.01) |
| H04L 29/06 | (2006.01) |
| H04N 21/235 | (2011.01) |
| H04N 21/488 | (2011.01) |

(52) U.S. Cl.
CPC ............ *H04L 29/06* (2013.01); *H04N 21/4884* (2013.01); *H04N 21/2353* (2013.01)

(58) Field of Classification Search
CPC ...... H04L 12/5825; H04N 7/26; H04N 7/465; H04N 21/2353; H04N 21/278; H04N 21/4884; H04N 21/80; H04N 21/83; H04N 21/84
USPC ......... 709/203, 212, 223, 228, 200–201, 205, 709/219, 227, 231–232, 246; 705/26; 369/100; 380/42; 455/3.06, 466, 557
See application file for complete search history.

(56) References Cited

U.S. PATENT DOCUMENTS

| | | | | |
|---|---|---|---|---|
| 5,805,153 | A | * | 9/1998 | Nielsen ............................ 725/37 |
| 6,006,241 | A | * | 12/1999 | Purnaveja et al. ............. 715/205 |
| 6,173,317 | B1 | * | 1/2001 | Chaddha et al. ............... 709/219 |
| 6,230,172 | B1 | * | 5/2001 | Purnaveja et al. ............. 715/205 |
| 6,742,028 | B1 | * | 5/2004 | Wang et al. .................... 709/223 |
| 6,950,804 | B2 | * | 9/2005 | Strietzel .......................... 705/26 |
| 7,003,550 | B1 | * | 2/2006 | Cleasby et al. ................ 709/205 |
| 7,289,819 | B2 | * | 10/2007 | Hosono .......................... 455/466 |
| 2002/0056123 | A1 | * | 5/2002 | Liwerant et al. ................ 725/87 |
| 2003/0018979 | A1 | * | 1/2003 | Hasegawa et al. ............ 725/126 |
| 2003/0131076 | A1 | * | 7/2003 | Nelson et al. .................. 709/219 |

(Continued)

FOREIGN PATENT DOCUMENTS

| | | |
|---|---|---|
| EP | 1458165 A2 | 9/2004 |
| JP | 2001272986 A | 10/2001 |

(Continued)

*Primary Examiner* — Imad Hussain

(57) ABSTRACT

A method of sharing a data content between a transmitter and a receiver, said method comprising the steps of:—retrieving (210) the data content in a server, from attribute information of said data content, and the attribute information being sent by the transmitter, and —generating (220) for said receiver an output message containing the retrieved data content.

9 Claims, 2 Drawing Sheets

(56) References Cited

U.S. PATENT DOCUMENTS

| | | | |
|---|---|---|---|
| 2004/0068532 A1* | 4/2004 | Dewing et al. | 709/200 |
| 2004/0073947 A1* | 4/2004 | Gupta | 725/134 |
| 2004/0172477 A1* | 9/2004 | Takeuchi et al. | 709/232 |
| 2004/0181487 A1 | 9/2004 | Hanson | |
| 2004/0225712 A1* | 11/2004 | Tajima et al. | 709/201 |
| 2005/0076136 A1* | 4/2005 | Cho et al. | 709/231 |
| 2005/0102298 A1* | 5/2005 | Kawaguchi et al. | 707/100 |
| 2005/0132414 A1* | 6/2005 | Bentley et al. | 725/105 |
| 2005/0216593 A1* | 9/2005 | Kotar | 709/227 |
| 2005/0262539 A1* | 11/2005 | Barton et al. | 725/90 |
| 2006/0095502 A1* | 5/2006 | Lewis et al. | 709/203 |
| 2006/0200534 A1* | 9/2006 | Nagai et al. | 709/212 |
| 2006/0204092 A1* | 9/2006 | Hamasaka et al. | 382/173 |
| 2006/0242325 A1* | 10/2006 | Ramaswamy et al. | 709/246 |
| 2007/0094366 A1* | 4/2007 | Ayoub | 709/223 |
| 2007/0136777 A1* | 6/2007 | Hasek et al. | 725/114 |
| 2007/0143493 A1* | 6/2007 | Mullig et al. | 709/232 |
| 2007/0149115 A1* | 6/2007 | White et al. | 455/3.06 |
| 2008/0010381 A1* | 1/2008 | Barraclough et al. | 709/228 |
| 2008/0034029 A1* | 2/2008 | Fang et al. | 709/203 |
| 2008/0119228 A1* | 5/2008 | Rao | 455/557 |
| 2008/0198723 A1* | 8/2008 | Li et al. | 369/100 |
| 2009/0106351 A1* | 4/2009 | Hanada et al. | 709/203 |
| 2009/0129587 A1* | 5/2009 | Zhou et al. | 380/42 |

FOREIGN PATENT DOCUMENTS

| | | |
|---|---|---|
| JP | 2002342218 A | 11/2002 |
| WO | 0215525 A1 | 2/2002 |
| WO | 2005109182 A2 | 11/2005 |

\* cited by examiner

METHOD AND APPARATUS FOR SHARING DATA CONTENT BETWEEN A TRANSMITTER AND A RECEIVER

FIELD OF THE INVENTION

The invention relates to a method and apparatus for sharing data content between a transmitter and a receiver.

BACKGROUND OF THE INVENTION

With the development of the next generation optical disc player, e.g. HD DVD (High Definition Digital Versatile Disc), BD (Blu-Ray Disc), the content providers have defined a structure (e.g. Viewer's Wish List defined in HD DVD, Graphics Reference Model defined in BD Read-Only), indicating that when a user is watching a content (video and/or audio), some data content, such as Scenes, PlayLists, or Clips of the content, can be extracted and saved, if the user think the Scenes, PlayLists, or Clips are interesting or important. The extracted data content can be saved on an optical disc (or a DRAM temporarily).

Based on the extracted data content, more and more users enjoy sharing their watching experience with other users, that is to say, sharing the extracted data content with other users.

In the conventional system of sharing a data content between a transmitter used by a user and a receiver used by another user, the transmitter (e.g. optical disc player, mobile phone, PDA) is used to generate a message (such as Multimedia Messages) including the extracted data content, and send the message to the receiver (another optical disc player, mobile phone, PDA).

However, using the conventional system to share the extracted data content between a transmitter and a receiver, causes at least three limitations to occur:
1. Based on protecting copyright: if the transmitter is not authorized by a content provider to extract the data content, the sharing data content process does not work. For example, some Clips of content are usually encrypted on BD-ROM for protecting the copyright of the content.
2. The maximum size of a message may be just 45 KB, which is much smaller than the data content (such as a video), if the transmitter is not authorized to encapsulate the data content, the transmitter cannot generate an adaptive message for sharing the data content with a receiver.
3. Different receivers may have different functional parameters (e.g. screen size, resolution, decoding format, capacity), which may not adapt to the received data content from the transmitter. So when the functional parameters of a receiver are not adaptive to the received data content, the receiver cannot play back the data content very well.

With the limitations mentioned above, it is difficult to share data content between a transmitter and receiver.

OBJECT AND SUMMARY OF THE INVENTION

It is an object of the invention to provide an improved method and apparatus for sharing data content between a transmitter and a receiver.

The method of sharing a data content between a transmitter and a receiver comprises the steps of:
retrieving (210) said data content in a server, from attribute information of the data content, and the attribute information being sent by the transmitter, and
generating (220) for said receiver an output message containing the retrieved data content.

The advantage is that the method of the invention achieves to protect copyright of data content, since a server is authorized by a content provider to access a non-encrypted data content, and the server can generate an output message for a receiver in accordance with attribute information of a data content sent by a transmitter (may also charge money to the transmitter or the receiver). Furthermore, in this invention, the message is generated by the authorized server, here is no need to transmit data content between the transmitter and the receiver directly, so the large size of the data content is not a problem for the message.

The generating step is adapted to functional parameters of said receiver.

The advantage is that the generated message is adapted to the functional parameters of the receiver, so that the receiver can present the message very well.

The invention also provides an apparatus comprising processing means for implementing the different steps of said method according to the invention.

BRIEF DESCRIPTION OF THE DRAWINGS

These and other aspects of the invention will become apparent from and will be elucidated with respect to the implementations and embodiments described hereinafter and with reference to the accompanying drawings, wherein.

Like reference numerals are used to denote similar parts throughout the figures.

DETAILED DESCRIPTION OF THE INVENTION

Figure 1:
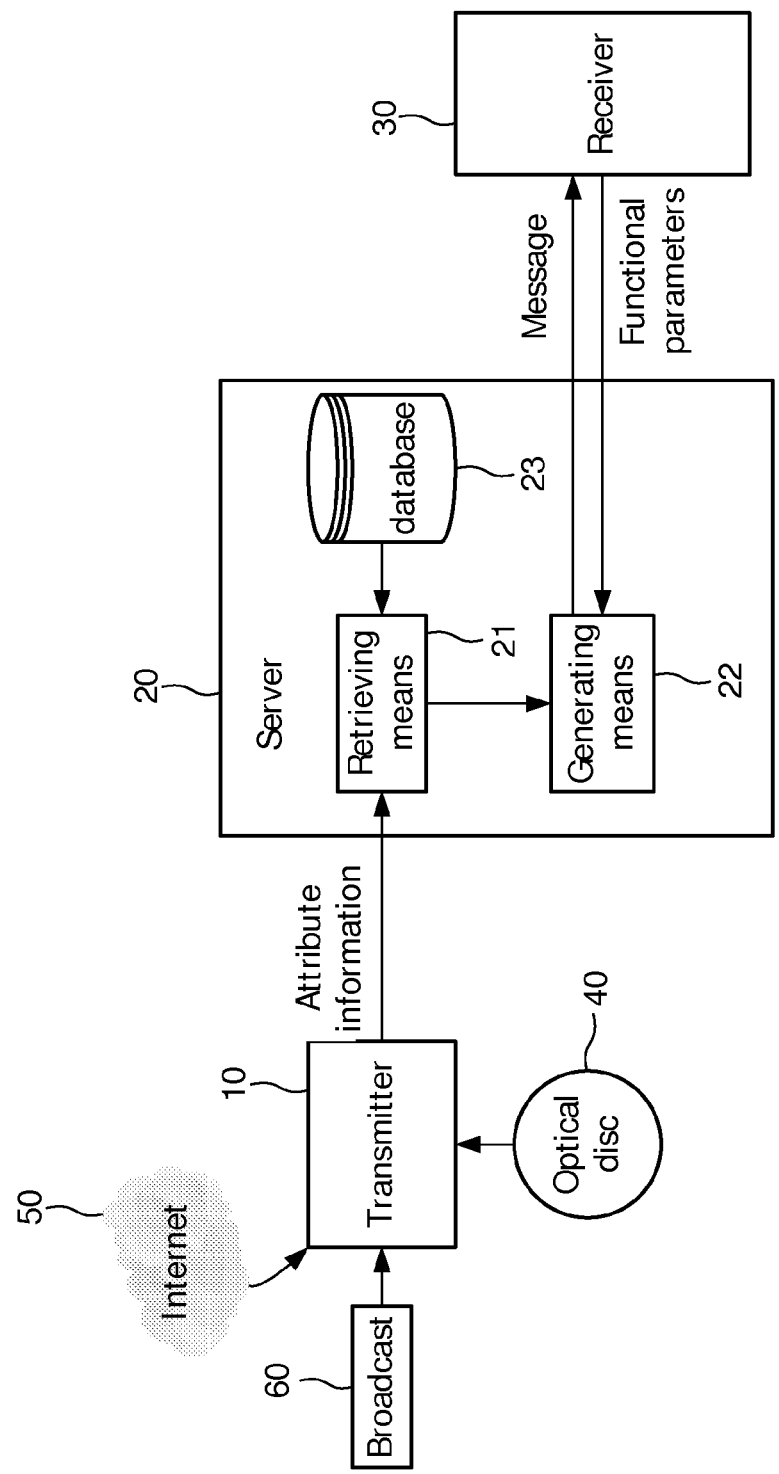
FIG. 1 is a schematic diagram illustrating a system with a server connecting with a transmitter and a receiver according to the invention.

FIG. 1 is a schematic diagram illustrating a system with a receiver 30 connecting with a transmitter 10 and a server 20. The transmitter 10 can send some attribute information of a data content to the server 20, and then, the server 20 can generate an output message for the receiver 30 in accordance with the attribute information of the data content, in order to share the data content between the transmitter 10 and the receiver 30.

The data content may be video scenes, PlayLists, or Clips included in an original content. The data content may also correspond to audio information. The original content may come from an optical disc 40, the internet 50, or a broadcast 60. The original content is also stored in the server 20. The original content can be video and/or audio. The attribute information corresponds to a timestamp (start time/end time) of the data content, the original content name, the data content name (such as Clip name, PlayList name), and other identifier information of the data content.

The transmitter 10 can be a player for an optical disc (e.g. computer disc drive, standalone apparatus . . . ), digital TV STB, a mobile device (e.g. mobile phone, PDA). The transmitter 10 is used to extract attribute information of the data content from the original content according to an instruction of a first user and then send the attribute information to the server 20. The transmitter 10 can also send some comments input by the first user to the server 20. These comments correspond to letters or voice.

The server 20 may be owned by a content provider, and the server 20 has a right to sell and process the data content. The server 20 can generate a message (e.g. Multimedia Message), including the data content, according to the attribute information of the data content sent by the transmitter 10, and send the message to the receiver 30, so that the data content can be shared between the receiver 30 and the transmitter 10. The message may also comprise these comments input by the first user.

The receiver 30 can be a player for optical discs (e.g. computer disc drive, standalone apparatus . . . ), digital TV STB, a mobile device (e.g. mobile phone, PDA). The receiver 30 can receive the message and present the data content included in the message to a second user. The receiver may further present these comments of the first user to the second user, if the message comprises these comments. The receiver 30 corresponds to some functional parameters, such as screen size, memory size, resolution, decoding format.

The server 20 may request the receiver 30 to send its functional parameters, so that the server 20 can process the data content adapted to the functional parameters. The transmitter 10 can also send the functional parameters of the receiver 30 to the server 20, if the transmitter 10 has previously stored the functional parameters.

The server 20 may comprise a database 23 for storing the original content.

The server 20 further comprises means for:
retrieving (21) the data content in the database 23, from attribute information of said data content, and said attribute information being sent by said transmitter, and
generating (22) for the receiver an output message containing the retrieved data content.

The means of retrieval (21) can identify in the database 23, data content that matches the attribute information.

For example: if the attribute information comprises the original content name, the data content name, and timestamp of the data content, the means of retrieval (21) can identify the attribute information first, then search the original content in the database 23 according to the original content name, finally, retrieve the data content according to the data content name and/or the timestamp of the data content in the original content.

The generating means (22) are adapted to the functional parameters of the receiver 30. The generating means (22) can scale down the retrieved data content or convert the retrieved data content to adapt to the functional parameters of the receiver.

For example: the size of the retrieved data content is 960× 1280, but a suitable functional parameter of the receiver is 600×800, so the generating means (22) have to scale down the retrieved data content to be 600×800 for adapting to the functional parameter of the receiver. If a suitable functional parameter of the receiver is to decode an MPEG2 data content, the generating means (22) can also convert the retrieved the data content to be MPEG2 data content for adapting to the functional parameter of the receiver.

The generating means (22) can encapsulate the data content adapted to the functional parameter in the message. The generating means (22) can also encapsulate the comments of the first user in the message.

The server 20 may further comprise means for charging fees to the first user or the second user, according to the time of generating the message or the value of the data content.

The apparatus server 20 comprises at least one CPU supported by firmware or software to control the means as mentioned to work.

Figure 2:
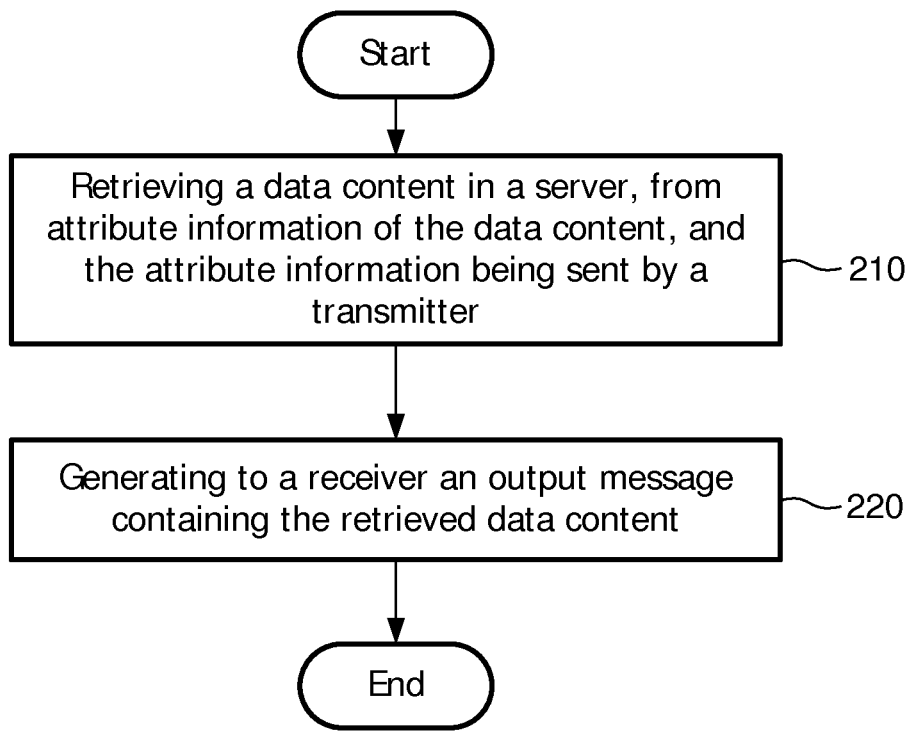
FIG. 2 is a flow chart of a method of sharing a data content between a transmitter and a receiver according to the invention.

FIG. 2 is a flow chart of a method of sharing a data content between a transmitter and a receiver, and the method comprises the steps of:
retrieving (210) said data content in a server, from attribute information of said data content, and said attribute information being sent by said transmitter, and
generating (220) for the receiver an output message containing the retrieved data content.

The retrieving step (210) further comprises identifying in the server, data content that matches the attribute information.

The generating step (220) is adapted to the functional parameters of the receiver. The generating step (220) may correspond to scale down the retrieved data content or convert the retrieved data content to adapt to the functional parameters of the receiver.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitably programmed computer. In the means claims enumerating several means, several of these means can be embodied by one and the same item of hardware. The use of the words first, second and third, etcetera do not indicate any ordering. These words are to be interpreted as names.

The invention claimed is:

1. A method of sharing a data content between a transmitter and a receiver, said method comprising the steps of:
the transmitter:
receiving data content from at least one of a plurality of sources; and
transmitting attribute information extracted from the data content and at least one comment destined for the receiver;
a server:
retrieving, at the server, said data content based on the extracted attribute information sent by said transmitter,
receiving functional presentation parameters of said receiver;
combining said retrieved data content and said at least one comment into a message; and
generating, for said receiver, an output message from the message, wherein, said output message is generated based on said received functional presentation parameters of said receiver.

2. The method as claimed in claim 1, wherein the retrieving step comprises identifying, in said server, data content that matches said attribute information.

3. An apparatus for sharing a data content between a transmitter and a receiver, said apparatus comprising:
means for:
retrieving said data content from a database based on attribute information of said data content,
transmitting, by said transmitter, said attribute information with at least one comment, the attribute information extracted from the data content, which was obtained from at least one independent source;
receiving functional presentation parameters of said receiver;

combining said retrieved data content and said at least one comment into a message;

generating, for said receiver, an output message from the message, wherein said output message is generated depending on functional presentation parameters of said receiver.

4. The apparatus as claimed in claim 3, wherein the means for retrieval further identifying, in said database, data content that matches said attribute information.

5. A system comprising a server connected in between a transmitter and a receiver, said transmitter containing data content and attribute information of the data content and transmitting said attribute information and at least one comment destined for the receiver, to said server, the attribute information extracted from the data content, said server including:

means for retrieving said data content in a database based on the attribute information of said data content, means for receiving functional presentation parameters of said receiver;

means for combining said retrieved data content and said at least one comment into a message; and means for generating, for said receiver, an output message from the message, wherein said output message is generated based on functional presentation parameters of said receiver.

6. A method of sharing a data content between a transmitter and a receiver, said method comprising the steps of:

the transmitter extracting attribute information from the data content and transmitting the extracted attribute information to a server along with a comment destined for the receiver;

the server, locally retrieving said data content depending on the extracted attribute information, a server receiving functional presentation parameters of said receiver;

the server combining said retrieved data content and said at least one comment into a message; and the server generating, for said receiver, an output message from the message, said output message generated in accordance with functional presentation parameters of said receiver.

7. A method of sharing a data content between a transmitter and a receiver, said method comprising the steps of:

the transmitter:

receiving the data content from at least one independent source, and transmitting attribute information extracted from the data content and a comment to a server;

the server:

locally retrieving said data content depending on the attribute information of said data content, determining whether functional presentation parameters of the receiver are available, communicating with the receiver to obtain the functional parameters of the receiver;

combining said retrieved data content and said at least one comment into a message; and generating, for said receiver, an output message from the message, the output message generated depending on the functional presentation parameters of the receiver.

8. The method of claim 7, wherein the transmitter transmits the functional presentation parameters of the receiver to the server.

9. The method of claim 7, wherein the receiver transmits the functional presentation parameters to the server.

* * * * *